US012258796B2

(12) United States Patent
Guerin

(10) Patent No.: US 12,258,796 B2
(45) Date of Patent: Mar. 25, 2025

(54) DOOR HANDLE ASSEMBLY HAVING AN OUTER BEZEL MECHANISM AND AN INNER BRACKET MECHANISM

(71) Applicant: U-Shin Italia S.p.A., Pianezza (IT)

(72) Inventor: Anthony Guerin, Pianezza (IT)

(73) Assignee: U-Shin Italia S.p.A., Pianezza (IT)

( * ) Notice: Subject to any disclaimer, the term of this patent is extended or adjusted under 35 U.S.C. 154(b) by 462 days.

(21) Appl. No.: 17/407,885

(22) Filed: Aug. 20, 2021

(65) Prior Publication Data

US 2021/0381287 A1 Dec. 9, 2021

Related U.S. Application Data

(63) Continuation of application No. PCT/EP2020/053799, filed on Feb. 13, 2020.

(30) Foreign Application Priority Data

Mar. 21, 2019 (EP) .................................... 19164248

(51) Int. Cl.

*E05B 79/22* (2014.01)
*E05B 85/10* (2014.01)
*E05B 85/16* (2014.01)

(52) U.S. Cl.

CPC ............ *E05B 85/107* (2013.01); *E05B 79/22* (2013.01); *E05B 85/16* (2013.01)

(58) Field of Classification Search

CPC ........ E05B 85/107; E05B 79/22; E05B 85/16; E05B 79/06; E05B 77/06; E05B 85/103

See application file for complete search history.

(56) References Cited

U.S. PATENT DOCUMENTS 4,956,943 A * 9/1990 Yamada .................. E05B 85/16 49/502
5,377,450 A * 1/1995 Varajon ................... E05B 85/12 296/146.7

(Continued)

FOREIGN PATENT DOCUMENTS

DE 102009045875 4/2011
FR 2280770 2/1976
JP 2005002670 A 1/2005

OTHER PUBLICATIONS

International Search Report for International Application PCT/EP2020/053799, mailed Mar. 11, 2020.

(Continued)

*Primary Examiner* — Michael P Ferguson
*Assistant Examiner* — Thomas L Neubauer
(74) *Attorney, Agent, or Firm* — Burris Law, PLLC

(57) ABSTRACT

A handle for a vehicle opening leaf includes an inner bracket mechanism and an outer bezel mechanism. The inner bracket mechanism is mounted from an inside of the opening leaf. The outer bezel mechanism is mounted from an outside of the opening leaf and is fixed to the inner bracket mechanism. The outer bezel mechanism includes a bezel and a grip mechanism. The bezel extends inward to an interior of the opening to allow access by a hand to the grip mechanism. The grip mechanism is configured to cooperate with a latch mechanism so as to unlatch the opening leaf. The grip mechanism is rotatably mounted on the outer bezel mechanism between a resting position in which the grip mechanism is flush with the opening leaf, and an opening position in which the grip mechanism drives the latch mechanism to unlatch the opening leaf.

18 Claims, 8 Drawing Sheets

(56) References Cited

U.S. PATENT DOCUMENTS

2006/0086049 A1* 4/2006 Mayenburg ............ B60J 5/0416
49/502
2012/0228886 A1* 9/2012 Muller .................. E05B 85/107
292/336.3
2014/0000167 A1* 1/2014 Patel ........................ E05B 81/34
49/32
2014/0327252 A1 11/2014 Sobecki et al.
2017/0306666 A1* 10/2017 Kunimatsu ............. E05B 85/12

OTHER PUBLICATIONS

Office Action issued in corresponding JP Application 2021-556475, issued Dec. 19, 2023, and an English summary translation, 6 pages.

* cited by examiner

DOOR HANDLE ASSEMBLY HAVING AN OUTER BEZEL MECHANISM AND AN INNER BRACKET MECHANISM

CROSS-REFERENCE TO RELATED APPLICATIONS

This application is a continuation of International Application No. PCT/EP2020/053799, filed on Feb. 13, 2020, which claims priority to and the benefit of EP 19164248.7, filed on Mar. 21, 2019. The disclosures of the above applications are incorporated herein by reference.

FIELD

The present disclosure relates to motor-vehicle door handles and, more particularly, to a motor-vehicle door-handle assembly having a closure which is selectively opened to permit user access to the vehicle.

BACKGROUND

The statements in this section merely provide background information related to the present disclosure and may not constitute prior art.

Door handles for motor vehicles are generally well-known and traditionally include handles protruding outwardly from the exterior surface of the door. Typically, these handles are mechanically coupled to a latch mechanism disposed within the door and operative to securely latch the door in a closed condition. Upon actuation of the handle by a user, the latch mechanism is released to permit the door to be opened.

More recently, flush-style handles have been introduced specified by the fact that the user-actuatable handle part is disposed substantially flush against the exterior surface of the vehicle door until a remote-control signal moved the handle by a motorized mechanism to a deployed position in which a user can actuate the handle to unlatch and then open the vehicle door.

Flush-style handles are a component which has a significant influence on the style of the vehicle bearing them. In this respect, vehicle manufacturers often seek to arrange the handle in the plane of the door so that it occupies a flush position (this being known as a flush arrangement), and more generally to render the handle as invisible as possible. Such flush door handles also have the advantage of reducing the aerodynamic noise caused by the rush of air as the vehicle is being driven along.

Flush-style handle mechanisms are somewhat complicated in their construction, are subject to blockage by ice build-up in colder climatic conditions and, moreover, must meet specified strength requirements.

Another door handle is known wherein the opening to access the actuatable handle is designed onto the motor vehicle opening leaf and wherein the actuatable handle rotates relative to a horizontal axis when actuated. That sort of door handle constantly leaves an opening into which the user can insert a hand so that the user can easily operate the handle. Such a handle is more ergonomic than the previous one, but also far more difficult to install due to the mounting configuration of both actuatable handle and latch mechanism on the motor vehicle opening leaf.

SUMMARY

This section provides a general summary of the disclosure and is not a comprehensive disclosure of its full scope or all of its features.

The present disclosure provides a door handle which is ergonomic, relatively invisible and convenient to manufacture.

The present disclosure also provides a handle for a vehicle opening leaf, which includes an inner bracket mechanism mounted from the inside of the opening leaf and an outer bezel mechanism mounted from outside the opening leaf. The outer bezel mechanism is fixed to the inner bracket mechanism from a clearance of the opening leaf. The outer bezel mechanism includes a bezel and a grip mechanism. The grip mechanism is configured to cooperate with a latch mechanism so as to unlatch the opening leaf. The bezel extends inward to the interior of the clearance to allow access by a hand to the grip mechanism. The grip mechanism is rotatably mounted on the outer bezel mechanism and is rotatable between a resting position in which the grip mechanism is flush with the opening leaf, and an opening position in which the grip mechanism drives the latch mechanism to unlatch the opening leaf.

In one form, such handle may be mounted on the opening leaf without any direct mechanical dependence between the grip mechanism and the opening leaf.

In another form, the outer bezel mechanism and the inner bracket mechanism are advantageously secured such that there is no relative movement between a bracket of the inner bracket mechanism and the outer bezel mechanism. Unlike the outer bezel mechanism, the grip mechanism is movable relative to the inner bracket mechanism and thus to the outer bezel mechanism.

In another form, the handle according to the present disclosure may advantageously include at least one of the improvements below, the technical characteristics forming these improvements can be taken alone or in combination: the grip mechanism is rotatably mounted around a vertical grip axis; the grip mechanism includes a gripping element and a grip lever, the grip lever supporting the gripping element; the gripping element and the grip lever being distinct from each other; the grip lever supports the vertical grip axis; the grip mechanism has further an activating position between the resting position and the opening position in which the grip mechanism projects outwardly with respect to the opening leaf and becomes graspable; the grip mechanism includes a grip elastic return element configured to drive the grip lever to the resting position; the grip mechanism includes a grip stop element configured to inhibit the gripping element from moving outward beyond the opening position; the grip mechanism includes a grip elastic return element configured to drive the grip lever from the activating or opening position to the rest position; the grip mechanism includes at least one radial plate; the grip mechanism includes a clipping element to securely maintain the gripping element onto the grip lever; the outer bezel mechanism includes a grip retain element extending from the bezel to inhibit the grip mechanism to move inward from the resting position; the grip retain element extends perpendicular to the vertical grip axis; the grip retain element is movable with the grip mechanism; the grip retain element includes a retaining plate and spindles extending from the retaining plate; the grip retain element is directly fixed to the grip lever; the grip retain element extends opposite from the gripping element; the outer bezel mechanism includes an elastic pawn fixed on the bezel to inhibit an end of the gripping element from being in contact with the bezel; the inner bracket mechanism includes an actuation mechanism cooperating with the grip mechanism such that the grip mechanism may be driven between the resting position and the activating position; the actuation mechanism includes an actuator lever; the actuator lever is rotatably mounted about an actuator axis and the actuator axis and the grip axis are parallel each other; the inner bracket mechanism includes the actuation mechanism (i.e., first actuation mechanism) and a second actuation mechanism cooperating with the grip mechanism such that the grip mechanism may drive the second actuation mechanism between the activating position and the opening position; the second actuation mechanism is the latch mechanism; the first actuation mechanism and the second actuation mechanism are mechanically independent each other; the second actuation mechanism includes an actuator lever (i.e., second actuator lever); the second actuation mechanism includes a body supporting the second actuator lever; the grip mechanism cooperates with the latch mechanism only on the activating or opening position; the latch mechanism includes a Bowden cable; the latch mechanism pulls the Bowden cable such that the opening leaf is unlatched and may be opened; the second actuation mechanism includes a lever elastic return element configured to drive the second actuator lever from an unlatch position to a latch position; in the latch position, the grip mechanism is in the resting position or in the activating position; in the unlatch position, the grip mechanism is in the opening position; in the resting position, the grip mechanism is mechanically independent from the first actuation mechanism; in the resting position, the grip mechanism is mechanically independent from the second actuation mechanism; in the activating position, the grip mechanism is mechanically in contact with the first actuation mechanism; in the resting position, the grip mechanism is mechanically in contact with the second actuation mechanism; the outer bezel mechanism includes an activation switch configured to activate the first actuation mechanism to move the grip mechanism from the resting position to the activating position; the activation switch is supported by the gripping element; the outer bezel mechanism includes a light emitting element; and the light emitting element is supported by the gripping element.

According to another form, the present disclosure provides a method of unlocking a latch mechanism of a vehicle opening leaf.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
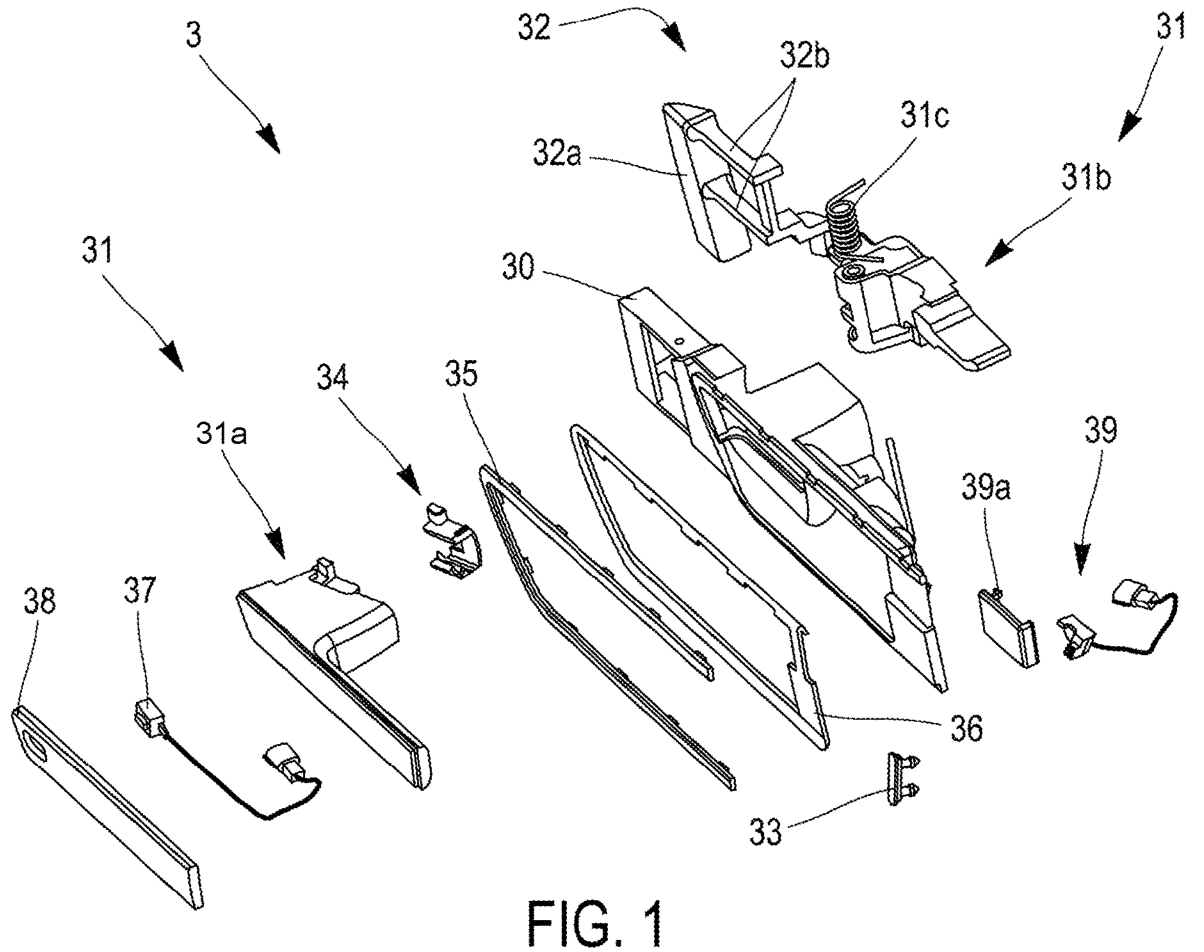
FIG. 1 is an exploded perspective view of an outer bezel mechanism including a grip mechanism according to one form of the present disclosure.
Figure 2:
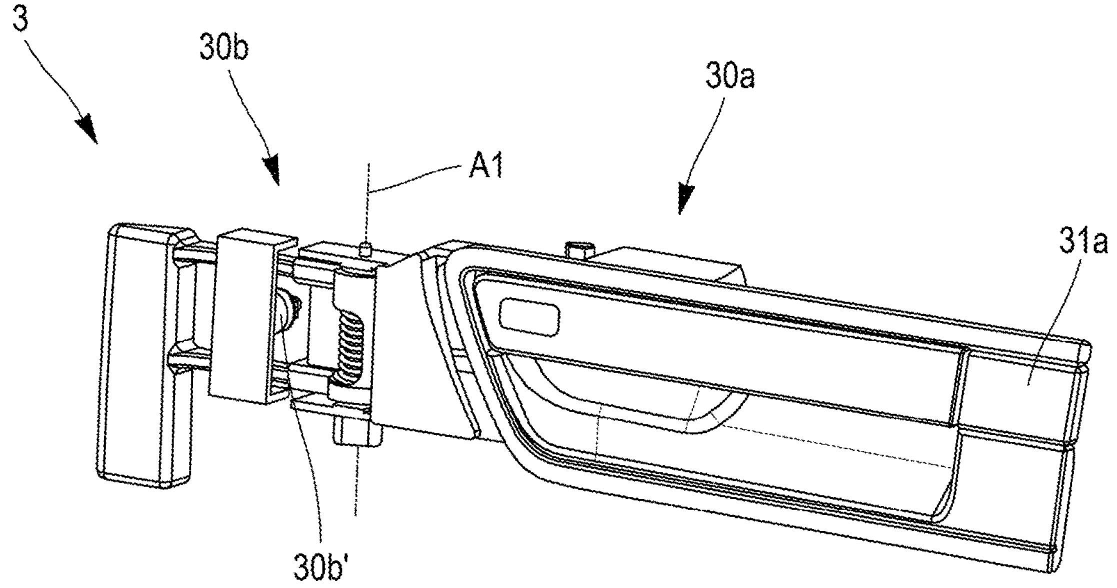
FIG. 2 is a front perspective view of the outer bezel mechanism shown in FIG. 1.
Figure 3:
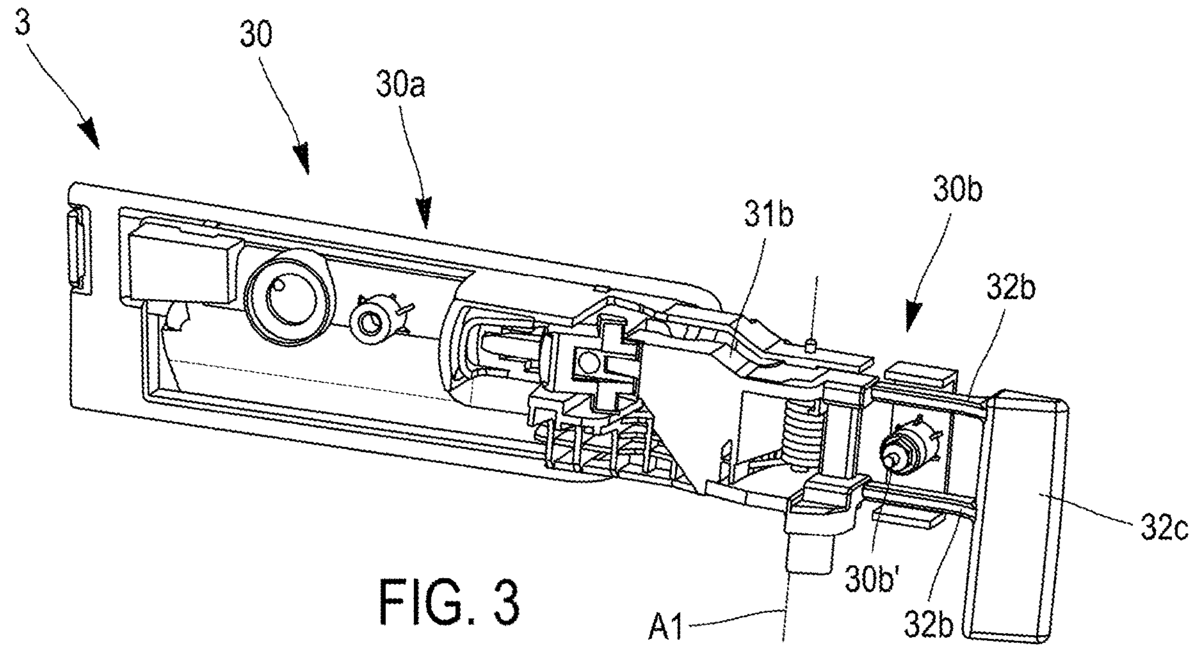
FIG. 3 is a rear perspective view of the outer bezel mechanism shown in FIG. 2.
Figure 4:
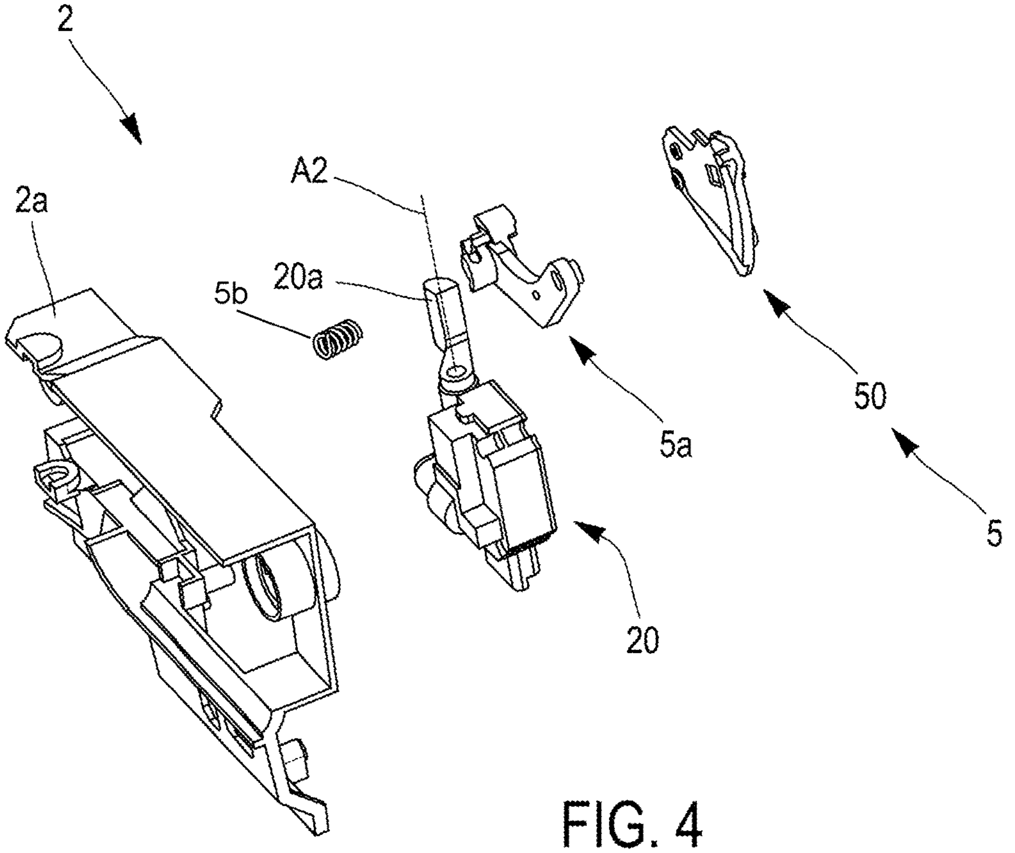
FIG. 4 is an exploded perspective view of an inner bracket mechanism according to the present disclosure configured to be mounted with the outer bezel mechanism shown in FIGS. 1 to 3.
Figure 5:
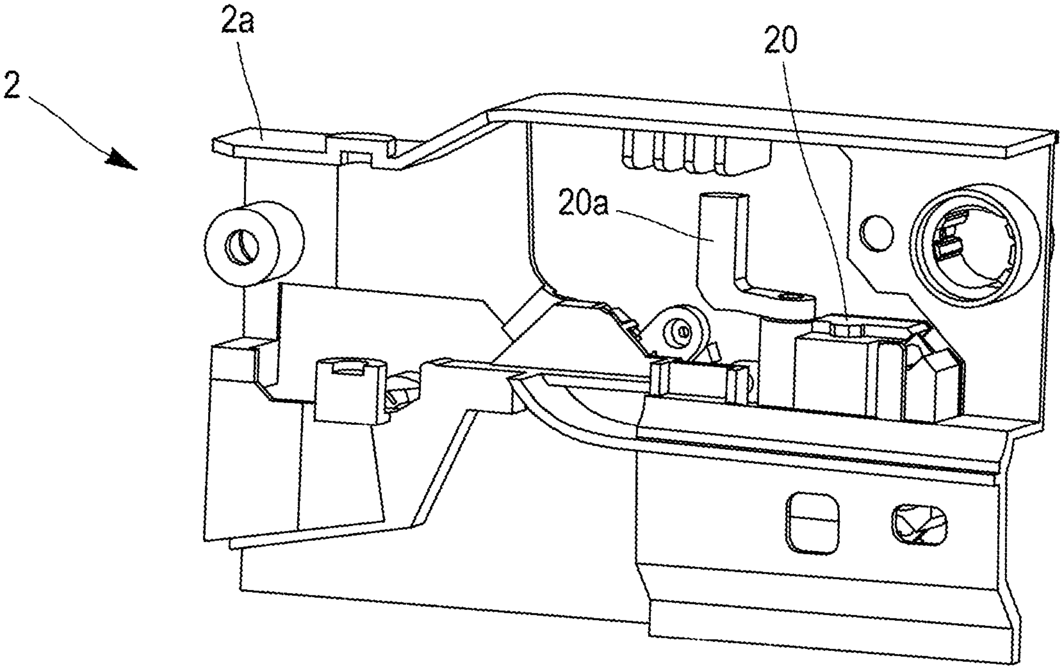
FIG. 5 is a front perspective view of the inner bracket mechanism shown in FIG. 4.
Figure 6:
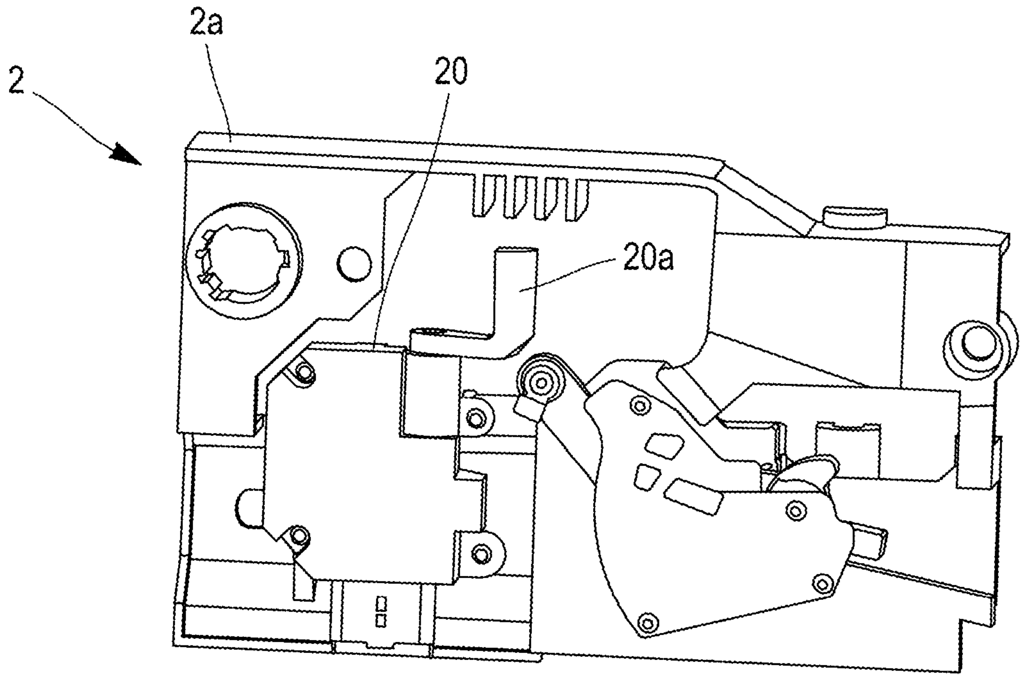
FIG. 6 is a rear perspective view of the inner bracket mechanism shown in FIG. 5.
Figure 7A:
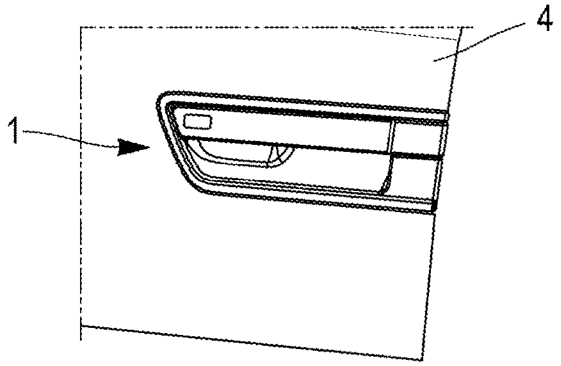
Figure 7B:
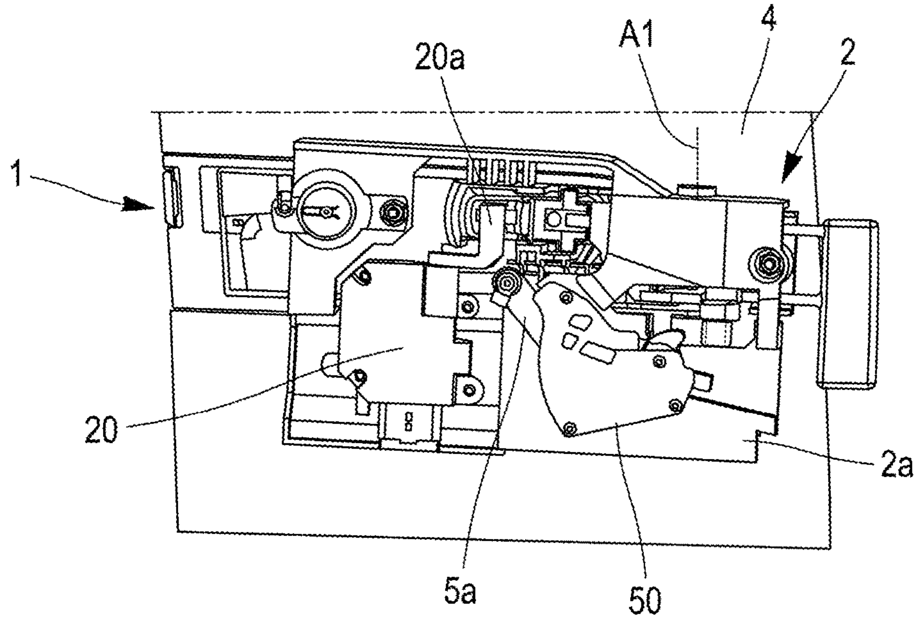
Figure 7C:
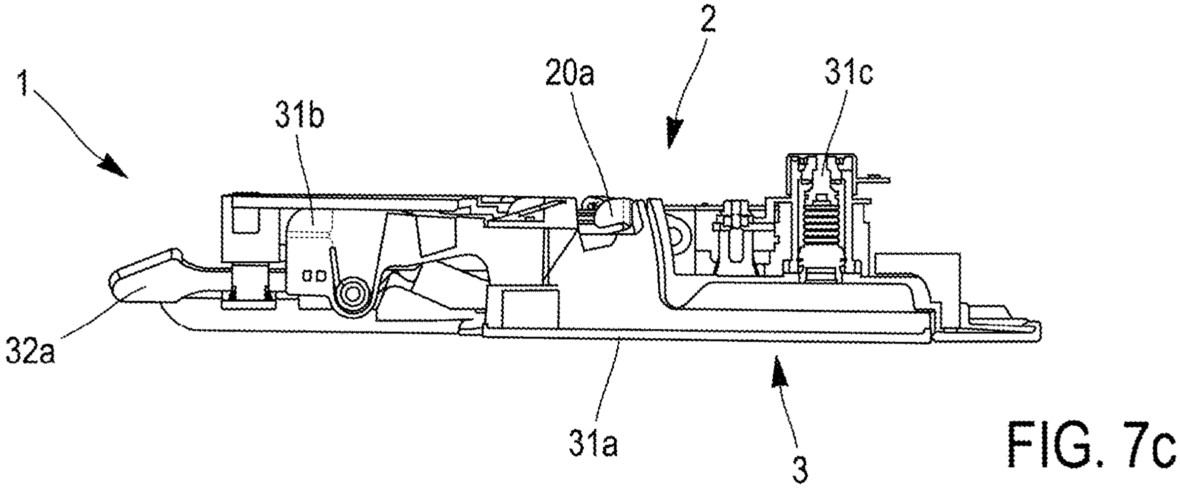

FIG. 7*a* is a front perspective view of a handle including the outer bezel mechanism of FIGS. 1 to 3 associated with a vehicle door, illustrated with the grip mechanism in a resting position according to the present disclosure;

FIG. 7*b* is a rear view of the handle and vehicle door of FIG. 7*a* mounted with the inner bracket mechanism of FIGS. 4 to 6;

FIG. 7*c* is a top view of the handle and the inner bracket mechanism of FIG. 7*b;*

Figure 8A:
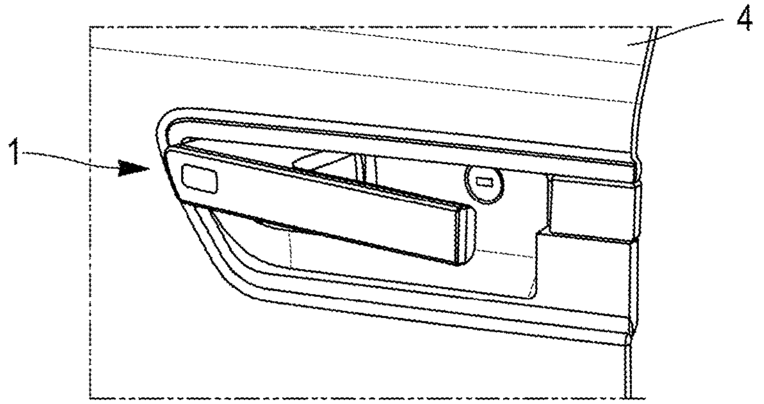
Figure 8B:
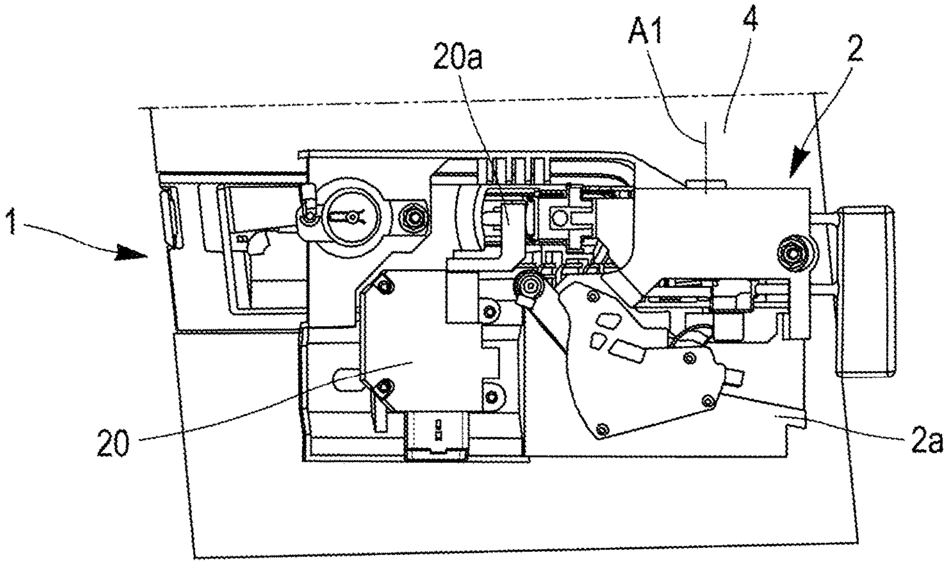
Figure 8C:
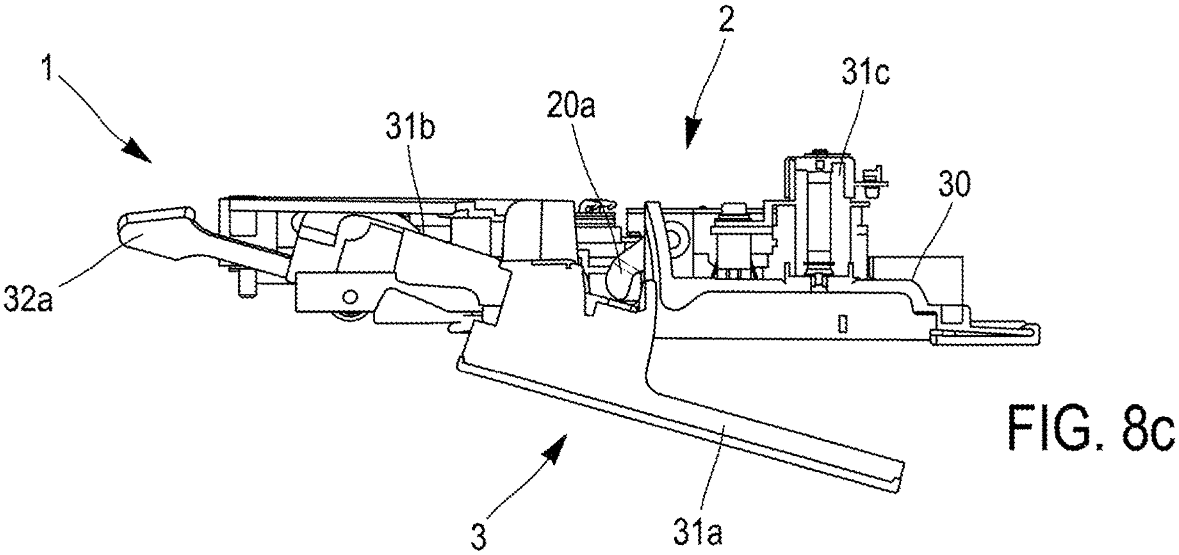

FIG. 8*a* is a front perspective view of the handle and vehicle door of FIG. 7*a*, but illustrated with the grip mechanism in an activating position according to the present disclosure;

FIG. 8*b* is a rear view of the handle and vehicle door of FIG. 8*a* mounted with the inner bracket mechanism of FIGS. 4 to 6;

FIG. 8*c* is a top view of the handle and the inner bracket mechanism of FIG. 8*b;*

Figure 9A:
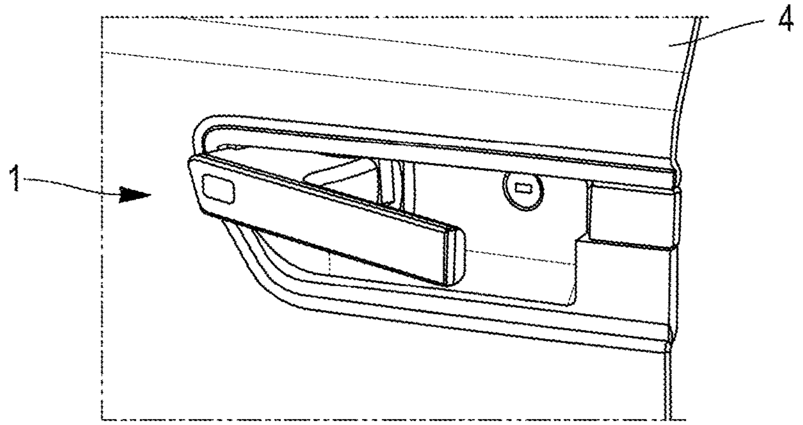
Figure 9B:
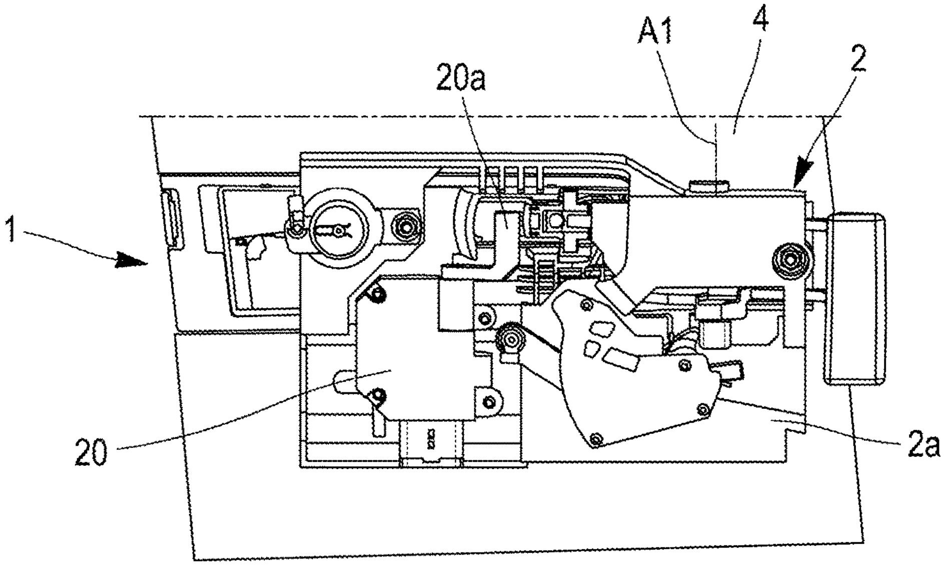
Figure 9C:
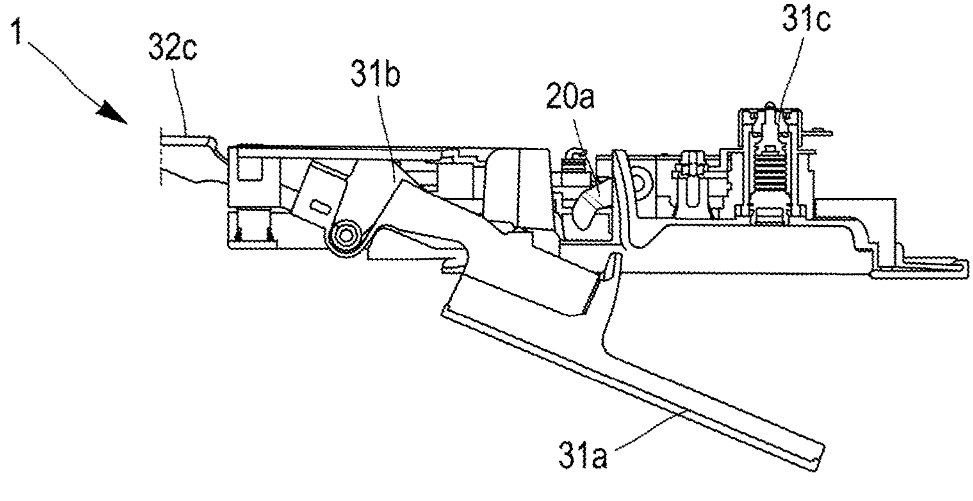

FIG. 9*a* is a front perspective view of the handle and vehicle door of FIG. 7*a*, but illustrated with the grip mechanism in an opening position according to the present disclosure;

FIG. 9*b* is a rear view of the handle and vehicle door of FIG. 9*a* mounted with the inner bracket mechanism of FIGS. 4 to 6;

FIG. 9*c* is a top view of the handle and inner bracket mechanism of FIG. 9*b;*

Figure 10:
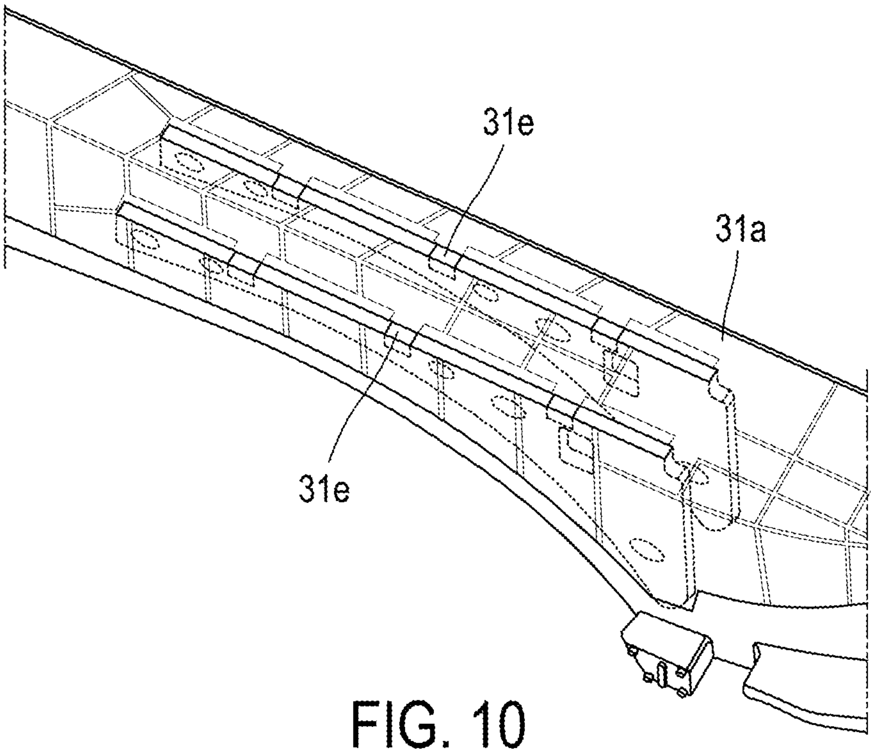
Figure 11:
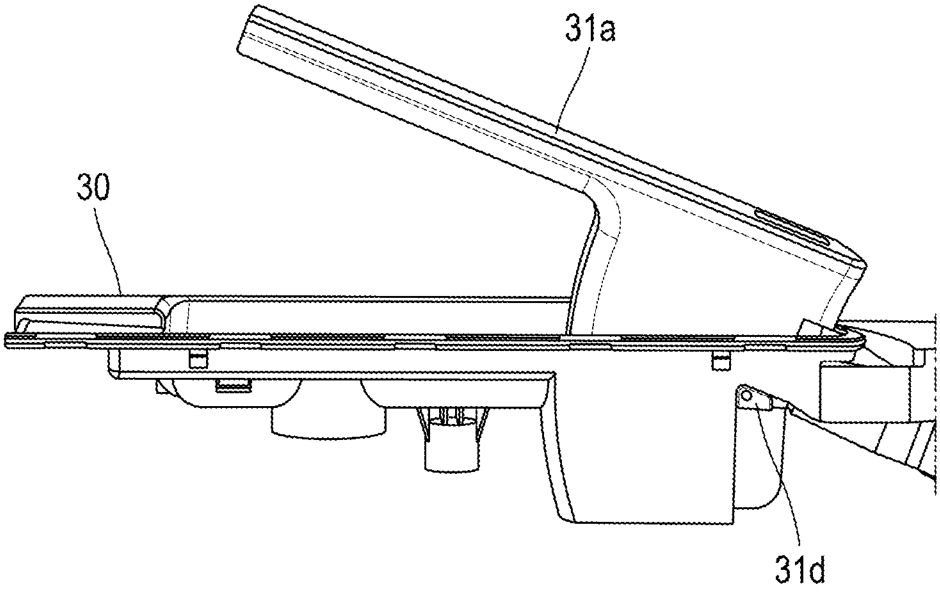
Figure 12:
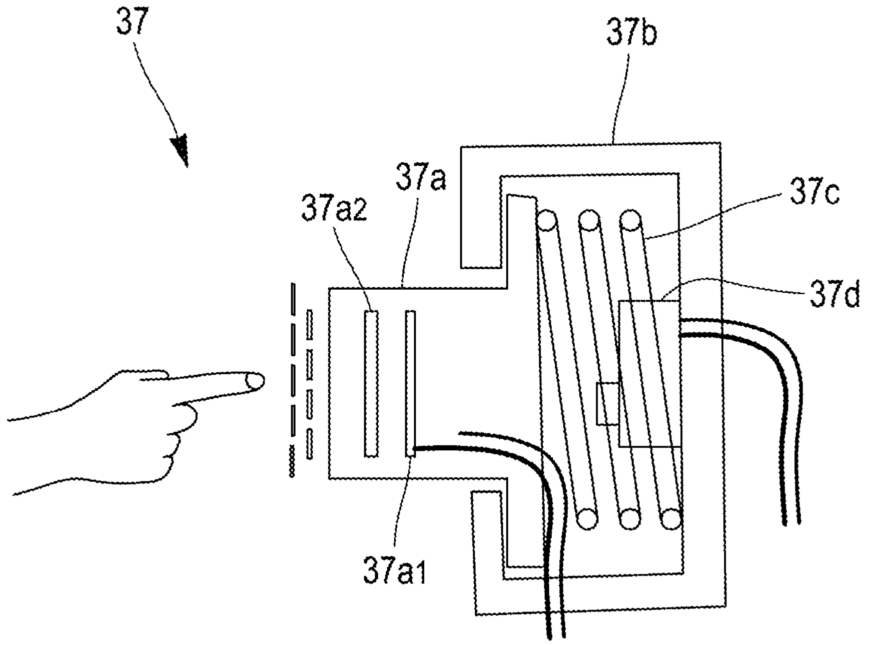
Figure 13:
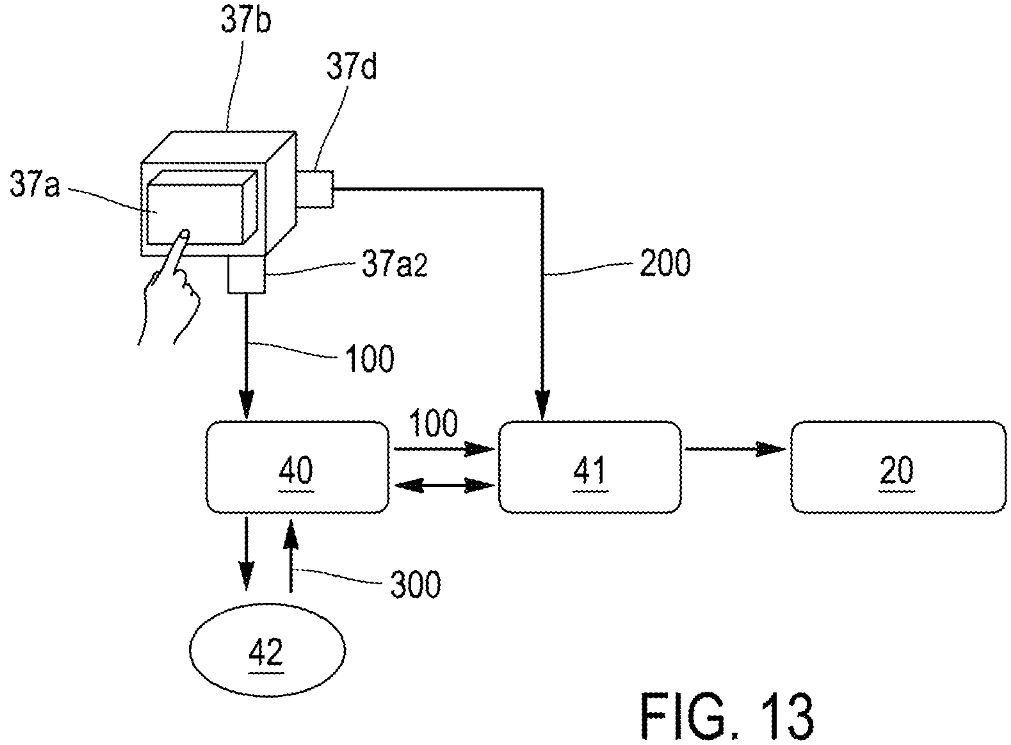

FIG. 10 is a perspective view of a gripping element of the grip mechanism of FIG. 1;

FIG. 11 is a top view of the gripping element of FIG. 10 in an opening position according to the present disclosure;

FIG. 12 is a schematic cross-sectional view of an activation switch of the outer bezel mechanism of FIG. 1; and FIG. 13 is a schematic block diagram of an unlocking method of the activation switch of FIG. 12 according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 to 11, the handle 1 according to one form of the present disclosure includes an inner bracket mechanism 2 and an outer bezel mechanism 3. The handle allows a user to open a vehicle door including an opening leaf 4.

The inner bracket mechanism 2 is mounted from the inside of the opening leaf 4 and the outer bezel mechanism 3 mounted from outside the opening leaf 4.

The outer bezel mechanism 3 is fixed to the inner bracket mechanism 2 from a clearance (not shown) of the opening leaf 4. The outer bezel mechanism 3 includes a bezel 30 and a grip mechanism 31. The grip mechanism 31 is configured to cooperate with a latch mechanism 5 (FIG. 4) so as to unlatch the opening leaf 4.

The bezel 30 extends inward to the interior of the clearance to allow access by a hand to said grip mechanism 31.

The grip mechanism 31 is rotatably mounted on the outer bezel mechanism 3 between a resting position in which the grip mechanism 31 is flush with opening leaf 4, and an opening position in which the grip mechanism 31 drives the latch mechanism 5 to unlatch the opening leaf 4.

The grip mechanism 31 includes an activating position between the resting position and the opening position in which the grip mechanism 31 projects outwardly with respect to the opening leaf 4 and becomes graspable.

The grip mechanism 31 includes a gripping element 31*a* and a grip lever 31*b*. The grip lever 31*b* supports the gripping element 31*a*. The gripping element 31*a* and the grip lever 31*b* are two distinct pieces.

The grip mechanism 31 is rotatably mounted around a vertical grip axis A1 (FIGS. 2, 3, 7*b*, 8*b*, and 9*b*). The grip lever 31*b* defines the vertical grip axis A1.

The grip mechanism 31 further includes a grip elastic return element 31*c*, a grip stop element 31*d*, and at least one radius plate 31*e*. The grip elastic return element 31*c* is configured to drive the grip lever 31*b* from the opening or activating position to the resting position. The grip stop element 31*d* is configured to inhibit the gripping element 31*a* to move outward beyond the opening position. The radius plate 31*e* is configured to strengthen the structure of the grip mechanism 31.

The outer bezel mechanism 3 includes a grip retain element 32 extending from the bezel 30 to inhibit the grip mechanism 31 to move inward from the resting position.

The grip retain element 32 extends perpendicularly to the vertical grip axis A1. The grip retain element 32 is movable with the grip mechanism 31. The grip retain element 32 includes a retaining plate 32*a* and spindles 32*b* extending from the retaining plate 32*a*. The grip retain element 32 is directly fixed to the grip lever 31*b*. The grip lever 31*b* includes corresponding openings to receive the spindles. The spindles 32*b* allow the retaining plate 32*a* to extend from the grip lever 31*b* during assembly of the handle 1.

The grip retain element 32 extends to the opposite end from the gripping element 31*a*.

The retaining plate 32*a* may be arranged so that its mass is an inertial mass of the gripping element 31*a* inhibiting the unlatching of the latch mechanism during a crash event.

The outer bezel mechanism 3 includes an elastic pawn 33 fixed on the bezel 30 to inhibit an end of the gripping element 31*a* from being in contact with the bezel 30. The elastic pawn 33 received in openings of the bezel 30.

The grip mechanism 31 includes a clipping element 34 to securely maintain the gripping element 31*a* onto the grip lever 31*b*.

The outer bezel mechanism 3 further includes a frame 35 and a gasket 36 received on the bezel 30.

The outer bezel mechanism 3 further includes an activation switch 37 configured to activate an electrical actuation mechanism (i.e., first actuation mechanism) to move the grip mechanism 31 from the resting position to the activating position. The gripping element 31*a* receives a cover 38 (FIG. 1) from which the activation switch 37 extends.

The bezel 30 has a receiving part 30*a* of the gripping element 31*a* and a fixing part 30*b* to fix the bezel onto the opening leaf 4. The fixing part 30*b* has a fixing hole 30*b*' to fix the bezel 30 on the opening leaf 4.

The outer bezel mechanism 3 includes a light emitting element 39 (FIG. 1). The light emitting element 39 is supported by the gripping element 31*a*. The light emitting element 39 has a cover element 39*a*.

The inner bracket mechanism 2 includes a bracket 2*a*. The bracket 2*a* supports the electrical actuation mechanism, the first actuation mechanism 20, and a second actuation mechanism.

The second actuation mechanism is the latch mechanism 5.

The first actuation mechanism 20 cooperates with the grip mechanism 31 such that the grip mechanism 31 may be driven between the resting position and the activating position. The first actuation mechanism 20 cooperates with the gripping element 31*a*.

The first actuation mechanism 20 includes an actuator lever or the first actuator 20*a*. The actuator lever 20*a* is rotatably mounted about an actuator axis A2 and the actuator axis A2 and the grip axis A1 are parallel each other.

The first actuator lever 20*a* is arranged so that it may engage the gripping element 31*a*.

The latch mechanism 5 cooperates with the grip mechanism 31 such that the grip mechanism 31 may drive the latch mechanism 5 between the activating position and the opening position. The first actuation mechanism 20 and the latch mechanism 5 are mechanically independent each other. That is, the first actuation mechanism 20 and the latch mechanism 5 have no direct mechanical dependence each other.

The latch mechanism 5 includes an actuator lever or second actuator lever 5*a* and a body 50 supporting the second actuator lever 5*a*. The latch mechanism 5 further includes a Bowden cable (not shown) and a lever elastic return element 5*b*. The latch mechanism 5 pulls the Bowden cable such that the opening leaf 4 is unlatched and may be opened. The lever elastic return element 5*b* is configured to drive the second actuator lever 5*a* from an unlatch position to a latch position.

Referring to FIGS. 7*a*-7*c*, the grip mechanism 31 is in the resting position. In the resting position, the gripping element 31*a* does not contact either the first actuation mechanism 20 or the second actuation mechanism 5. That is, in that resting position, the gripping element 31*a* does not contact the first actuator lever 20*a* and the grip lever 31*b* does not contact the second actuator lever 5*a*. Further, the first actuation mechanism 20 is in a rest position and the second actuation mechanism 5 in the latch position.

Referring to FIGS. 8*a*-8*c*, the grip mechanism 31 is in the activating position. In the activating position, the gripping element 31*a* contacts both the first actuation mechanism 20 and the second actuation mechanism 5. That is, in the activating position, the gripping element 31*a* contacts the first actuator lever 20*a* and the grip lever 31*b* contacts the second actuator lever 5*a*. The first actuator lever 20*a* pushes the gripping element 31*a* from the resting position to the activation position. Then, the first actuation mechanism 20 is in an active position and the second actuation mechanism 5 in the latch position. In the activating position, the hand of a user may grab the gripping element 31*a*.

Referring to FIGS. 9*a*-9*c*, the grip mechanism 31 is in the opening position. In the opening position, the gripping element 31*a* does not contact the first actuation mechanism 20 and it engages the second actuation mechanism 5. In the opening position, the hand of a user pulls the gripping element 31*a* from the active position to the opening position. That is, in the activating position, the gripping element 31*a* does not contact the first actuator lever 20*a* and the grip lever 31*b* engages the second actuator lever 5*a*. The grip lever 31*b* pushes the second actuator lever 5*a* and the latch mechanism 5 moves from the latch position to the unlatch position. Further, the first actuation mechanism 20 is still in the active position and the second actuation mechanism 5 in the unlatch position.

In case of loss of power to access the gripping element 31*a*, the user inserts a hand into the bezel 30. The bowl-shaped bezel 30 guides the user's hand to grab the gripping element 31*a*. Thus, the grip mechanism 31 can be operated by the user to unlatch the latch mechanism 5 and open the door.

As shown in FIG. 12, the activation switch 37 is configured to activate an electrical actuation mechanism or the first actuation mechanism 20.

The activation switch 37 has a button case 37*a* mounted in an housing 37*b* to be movable between a rest position where an elastic element 37*c* presses the button case 37*a* outer to the housing 37*b* (i.e., the elastic element 37*c* moves the button case 37*a* away from the switch 37*d*) and an active position where an elastic element 37*c* is pressed by the user so that the button case 37*a* is pushed inner to the housing 37*b* (i.e., the button case 37*a* moves toward the switch 37*d* and compresses the elastic element 37*c*).

The activation switch 37 further includes the switch 37*d* fixed to housing 37*b* so that it can be pressed when the button case 37*a* is in its active position.

The button case 37*a* includes a printed circuit board 37*a*1 and a sensor 37*a*2 connected to the printed circuit board 37*a*2.

The printed circuit board 37*a*1 and the sensor 37*a*2 are connected to a first processing unit 40 and the switch 37*d* is connected to a second processing unit 41.

With additional reference to FIG. 13, the first processing unit 40 and the second processing unit 41 are connected together. The first processing unit 40 is connected to at least one crash sensor 42 and the second processing unit 41 is connected to the electrical actuation mechanism 20.

The button case sensor 37*a*2 is advantageously a presence sensor able to detect a user's hand or a finger with or without touching the button case 37*a*.

According to another form, FIG. 13 illustrates a method of unlocking a latch mechanism 5 of a vehicle opening leaf including at least one step described below.

When the button case sensor 37*a*2 detects the user's hand or a finger, a first opening signal 100 is sent to the first processing unit 40. The first processing unit 40 then communicates the first opening signal 100 to the second processing unit 41. The second processing unit 41 finally activates the electrical actuation mechanism 20.

When the button case 37*a* is in the active position, the press of the switch 37*d* is detected. A second opening signal 200 is sent to the second processing unit 41. The second processing unit 41 then will wait for the first opening signal 100 from the first processing unit 40. If the first opening signal 100 from the first processing unit 40 is received, the second processing unit 41 finally activates the electrical actuation mechanism 20. If the opening signal from the first processing unit 40 is not received, the first processing unit 40 will check if a crash signal 300 is received from the crash sensor 42. If no crash signal 300 is received by the first processing unit 40, the second processing unit 41 receives the information that no crash signal 300 is detected and the second processing unit 41 finally activates the electrical actuation mechanism 20. If a crash signal 300 is received by the first processing unit 40, the second processing unit 41 receives the information that a crash signal 300 is detected and the second processing unit 41 will not allow the activation of the electrical actuation mechanism 20. In any case, when the button case sensor 37*a*2 does not detect the user's hand or a finger and when the press of the switch 37*d* is detected in the event of an accident, the second processing unit 41 will not allow the activation of the electrical actuation mechanism 20.

The expression "contact" refers to a direct contact between two pieces.

The expression "independent" refers to two pieces having no direct mechanical relationship.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A handle for an opening leaf of a vehicle, the handle comprising:

an inner bracket mechanism mounted from an inside of the opening leaf; and, an outer bezel mechanism mounted from an outside of the opening leaf, in direct contact to the inner bracket mechanism from an opening of the opening leaf, the outer bezel mechanism includes a bezel and a grip mechanism, the bezel extends inward to an interior of the opening to allow access by a hand to the grip mechanism, the grip mechanism being configured to cooperate with a latch mechanism so as to unlatch the opening leaf, wherein the grip mechanism is rotatably mounted on the outer bezel mechanism between a resting position in which the grip mechanism is flush with the opening leaf, and an opening position in which the grip mechanism drives the latch mechanism to unlatch the opening leaf, wherein the outer bezel mechanism comprises a grip retaining element extending from the bezel to prevent the grip mechanism to move inward from the resting position, the grip retaining element comprises a retaining plate and spindles extending from the retaining plate, the grip mechanism comprises a gripping element and a grip lever, the grip lever supporting the gripping element, the grip retaining element being directly fixed to the grip lever, the grip lever having corresponding openings to receive the spindles.

2. The handle according to claim 1, wherein the grip mechanism is rotatably mounted around a vertical grip axis.

3. The handle according to claim 2, wherein the grip mechanism includes an activating position between the resting position and the opening position in which the grip mechanism projects outwardly with respect to the opening leaf and becomes graspable.

4. The handle according to claim 1, wherein the grip mechanism includes an activating position between the resting position and the opening position in which the grip mechanism projects outwardly with respect to the opening leaf and becomes graspable.

5. The handle according to claim 4, wherein the inner bracket mechanism includes a first actuation mechanism cooperating with the grip mechanism such that the grip mechanism is driven by the first actuation mechanism between the resting position and the activating position.

6. The handle according to claim 5, wherein the inner bracket mechanism includes a second actuation mechanism cooperating with the grip mechanism such that the grip mechanism is driven by the second actuation mechanism between the activating position and the opening position.

7. The handle according to claim 6, wherein the second actuation mechanism is the latch mechanism.

8. The handle according to claim 7, wherein the first actuation mechanism and the second actuation mechanism are mechanically independent each other.

9. The handle according to claim 6, wherein in the resting position, the grip mechanism is mechanically independent from the first actuation mechanism.

10. The handle according to claim 6, wherein in the resting position, the grip mechanism is mechanically independent from the second actuation mechanism.

11. The handle according to claim 6, wherein in the activating position, the grip mechanism is mechanically in contact with the first actuation mechanism.

12. The handle according to claim 6, wherein in the resting position, the grip mechanism is mechanically in contact with the second actuation mechanism.

13. The handle according to claim 4, wherein the grip mechanism cooperates with the latch mechanism only on the activating or opening position.

14. The handle according to claim 4, wherein the grip mechanism is rotatably mounted around a vertical grip axis and cooperates with the latch mechanism only on the activating or opening position.

15. The handle according to claim 1, wherein the grip mechanism is rotatably mounted around a vertical grip axis and includes an activating position between the resting position and the opening position in which the grip mechanism projects outwardly with respect to the opening leaf and becomes graspable, the grip mechanism includes a gripping element and a grip lever supporting the gripping element.

16. The handle according to claim 1, wherein the grip mechanism is rotatably mounted around a vertical grip axis and includes an activating position between the resting position and the opening position in which the grip mechanism projects outwardly with respect to the opening leaf and becomes graspable.

17. The handle according to claim 1, wherein the grip mechanism is rotatably mounted around a vertical grip axis and includes an activating position between the resting position and the opening position in which the grip mechanism projects outwardly with respect to the opening leaf and becomes graspable, and wherein the inner bracket mechanism includes an actuation mechanism cooperating with the grip mechanism, the actuation mechanism driving the grip mechanism between the resting position and the activating position.

18. The handle according to claim 1, wherein the inner bracket mechanism and the outer bezel mechanism are fixed in direct contact to each other.

* * * * *